(12) United States Patent
Ogawa et al.

(10) Patent No.: US 9,762,040 B2
(45) Date of Patent: Sep. 12, 2017

(54) WIRING HARNESS AND METHOD OF ASSEMBLING THE SAME

(75) Inventors: Tatsuo Ogawa, Kosai (JP); Masayuki Ikeno, Hamamatsu (JP); Keisuke Kato, Hamamatsu (JP)

(73) Assignees: YAZAKI CORPORATION, Tokyo (JP); SUZUKI MOTOR CORPORATION, Hamamatsu-shi (JP)

( * ) Notice: Subject to any disclaimer, the term of this patent is extended or adjusted under 35 U.S.C. 154(b) by 343 days.

(21) Appl. No.: 13/700,626

(22) PCT Filed: May 30, 2011

(86) PCT No.: PCT/JP2011/062425
§ 371 (c)(1),
(2), (4) Date: Nov. 28, 2012

(87) PCT Pub. No.: WO2011/152367
PCT Pub. Date: Dec. 8, 2011

(65) Prior Publication Data
US 2013/0068522 A1    Mar. 21, 2013

(30) Foreign Application Priority Data

May 31, 2010  (JP) .................................. 2010-124966

(51) Int. Cl.
*H02G 3/04*  (2006.01)
*B60R 16/02*  (2006.01)
(Continued)

(52) U.S. Cl.
CPC ....... *H02G 3/0406* (2013.01); *B60R 16/0215* (2013.01); *H01R 43/28* (2013.01);
(Continued)

(58) Field of Classification Search
CPC ........ H02G 3/32; H02G 3/02; B60R 16/0307; B60R 16/03
See application file for complete search history.

(56) References Cited

U.S. PATENT DOCUMENTS 4,874,908 A  * 10/1989  Johansson ............ H01B 7/0045
                                                     174/112
5,911,450 A  *  6/1999  Shibata ................ B60R 16/0207
                                                     174/112
(Continued)

FOREIGN PATENT DOCUMENTS

CN        1046415 A    10/1990
DE        3616649 A1   11/1987
(Continued)

OTHER PUBLICATIONS

Office Action dated Mar. 11, 2014 issued by the Japanese Patent Office in counterpart Japanese Patent Application No. 2010-124966.
(Continued)

*Primary Examiner* — Zachary M Pape
*Assistant Examiner* — Douglas Burtner
(74) *Attorney, Agent, or Firm* — Sughrue Mion, PLLC (57) ABSTRACT

There is provided a wiring harness in which a plurality of cables are bound by a plurality of protectors provided at intervals in a longitudinal direction, the wiring harness arranged along an arranging path of a fixed portion. The cables are collectively held by the protectors. The lengths of the plurality of cables between the protectors are made different such that the cables are bent between the protectors.

8 Claims, 7 Drawing Sheets

(51) Int. Cl.
   *H01R 43/28* (2006.01)
   *H02G 3/00* (2006.01)
   *H02G 3/32* (2006.01)
(52) U.S. Cl.
   CPC .............. *H02G 3/00* (2013.01); *H02G 3/32* (2013.01); *Y10T 29/49194* (2015.01)

(56) References Cited

U.S. PATENT DOCUMENTS

| | | | |
|---|---|---|---|
| 6,247,963 B1 | 6/2001 | Rattner | |
| 6,334,284 B1* | 1/2002 | Provitola | E04B 1/32 403/389 |
| 7,119,280 B1* | 10/2006 | Ray | H02G 3/0437 174/135 |
| 8,502,071 B2* | 8/2013 | Caveney | H02G 3/22 174/100 |
| 8,879,278 B2* | 11/2014 | Keith | H04Q 1/06 174/72 A |
| 8,957,310 B2* | 2/2015 | Kaihotsu | H02G 3/0475 138/118 |
| 2002/0117322 A1* | 8/2002 | Hilgert | H02G 3/0608 174/99 B |
| 2002/0132506 A1* | 9/2002 | Wilson | H01R 13/64 439/207 |
| 2005/0029005 A1* | 2/2005 | Arai | H02G 3/30 174/72 A |
| 2005/0217888 A1* | 10/2005 | Arai | H02G 3/0487 174/72 A |
| 2009/0272576 A1* | 11/2009 | Medina | B60R 16/0215 174/72 A |
| 2011/0061932 A1* | 3/2011 | Ogawa | B60R 16/0207 174/72 A |
| 2013/0277106 A1* | 10/2013 | Toyama | B60R 16/0207 174/72 A |
| 2013/0306371 A1* | 11/2013 | Toyama | B60R 16/0207 174/72 A |
| 2014/0013893 A1* | 1/2014 | Asano | B25J 18/00 74/490.02 |
| 2015/0136479 A1* | 5/2015 | Oga | H01B 1/023 174/72 A |
| 2015/0171609 A1* | 6/2015 | Larson | G02B 6/4441 52/220.1 |

FOREIGN PATENT DOCUMENTS

| | | |
|---|---|---|
| DE | 202009007626 U1 | 11/2009 |
| FR | 1256715 A | 3/1961 |
| GB | 555745 A | 9/1943 |
| JP | 64-31309 A | 2/1989 |
| JP | 04-206314 A | 7/1992 |
| JP | 07-298446 A | 11/1995 |
| JP | 9-23530 A | 1/1997 |
| JP | 2001-359217 A | 12/2001 |
| JP | 2002-225648 A | 8/2002 |
| JP | 2005-295728 A | 10/2005 |
| JP | 2006-352977 A | 12/2006 |

OTHER PUBLICATIONS

Office Action, dated Jul. 30, 2013, issued by the Japanese Patent Office, in counterpart application No. 2010124966.
Supplementary European Search Report dated Oct. 24, 2013 issued by the European Patent Office in counterpart European Application No. 11789770.2.
Communication from the State Intellectual Property Office of P.R. China dated Dec. 29, 2014, in a counterpart application No. 201180027197.2.
International Search Report for PCT/JP2011/062425 dated Jun. 21, 2011 [PCT/ISA/210].
Written Opinion for PCT/JP2011/062425 dated Jun. 21, 2011 [PCT/ISA/237].
Communication from the European Patent Office dated Jul. 24, 2015 in a counterpart European Application No. 11789770.2.
Office Action dated Sep. 15, 2015, issued by the State Intellectual Property Office of the People's Republic of China in counterpart Chinese Application No. 201180027197.2.
Communication dated Mar. 4, 2016, issued by the State Intellectual Property Office of P.R. China in counterpart Chinese Application No. 201180027197.2.
Communication dated Sep. 14, 2016, issued by the State Intellectual Property Office of the People's Republic of China in counterpart Chinese Patent Application No. 201180027197.2.
Communication dated Dec. 20, 2016, issued by the State Intellectual Property Office of the People's Republic of China in counterpart Chinese Patent Application No. 201180027197.2.

* cited by examiner

WIRING HARNESS AND METHOD OF ASSEMBLING THE SAME

TECHNICAL FIELD

The present invention relates to a wiring harness for a vehicle such as an automobile, and a method of assembling the wiring harness.

BACKGROUND ART

A wiring harness for a vehicle such as an automobile is configured by collectively lumping a plurality of cables (electric wires) with protectors and the like, and is fixed to the frame of a vehicle body (see Patent Documents 1 to 4, for instance). Then, a plurality of portions of the wiring harness is fixed to the frame of the vehicle body by the protectors, such that the wiring harness is routed along the frame of the vehicle body.

PRIOR ART DOCUMENT

Patent Documents

Patent Document 1: JP-A-2005-295728
Patent Document 2: JP-A-7-298446
Patent Document 3: JP-A-2002-225648
Patent Document 4: JP-A-2001-359217

SUMMARY OF INVENTION

Problems to be Solved by Invention

In order to arrange the above-mentioned wiring harness along the frame of the vehicle body, the plurality of cables are bound with the protectors while being bent, whereby the wiring harness is made in a shape according to an arranging path.

However, for a wiring harness which can be mounted on an electric automobile, a hybrid car, or the like and allows a high-voltage high current to flow, in general, cables having large diameters and high rigidity are used. Therefore, each of these cables for a wiring harness has the property of being rigid and hard to be bent.

Therefore, it takes considerable effort and time to bend the plurality of cables having high rigidity and bind the cables with the protectors.

Also, since the bound and bent wiring harness is bulky, it is difficult to secure a storage place, and transfer efficiency is also not good.

The present invention was made in view of the above-mentioned circumferences, and an object of the present invention is to provide a wiring harness which can suppress bulkiness before routing, and be easily made in a shape according to an arranging path, and a method of assembling the wiring harness.

Means for Solving Problems

The above-mentioned object related to the present invention can be achieved by the following configurations.

(1) A wiring harness in which a plurality of cables are bound by a plurality of protectors provided at intervals in a longitudinal direction, the wiring harness arranged along an arranging path of a fixed portion, wherein: the cables are collectively held by the protectors, and the lengths of the plurality of cables between the protectors are made different such that the cables are bent between the protectors.

According to this wiring harness, the lengths of at least one cable between the protectors are made different from the lengths of the other cables between the protectors such that the cables can be bent between the protectors. Therefore, it is possible to easily arrange the cables in a shape according to the bent arranging path.

Further, before the cables are held by the protectors, the individual cables are in a separated and straight state. Therefore, it is possible to suppress bulkiness before routing, and to facilitate storage and transfer.

(2) The wiring harness according to (1), wherein the cables are twisted between adjacent protectors such that a bending direction is changed.

According to this wiring harness, the cables are twisted between adjacent protectors, whereby the bending direction between the protectors is changed. Therefore, it is possible to make the cables correspond to a three-dimensional arranging path of a fixed portion.

(3) The wiring harness according to (1) or (2), wherein marks put at different positions of at least one cable and the other cable in the longitudinal direction exist at positions to be mounted on the protectors.

According to this wiring harness, marks put at different positions of the one cable and another cable in the longitudinal direction exist at the held positions by one protector. Therefore, the cables are bent between the protectors.

(4) A method of assembling a wiring harness in which a plurality of cables are bound by a plurality of protectors provided at intervals in a longitudinal direction, the wiring harness arranged along an arranging path of a fixed portion, comprising: mounting the plurality of protectors at predetermined positions of one cable, respectively; and making the other cable be held by each protector such that the length of the other cable between adjacent protectors is different from the length of the one cable, thereby bending the cables between the protectors due to the difference between the lengths of the cables between the protectors.

According to this method of assembling a wiring harness, the protectors are mounted at the predetermined positions of the one cable, and the other cables are held by each protector such that between adjacent protectors, the length of the one cable are different from the lengths of the other cables. Therefore, it is possible to easily bend the cables between the protectors due to the differences between the lengths of the individual cables between the protectors, thereby making a wiring harness which can be easily routed in a shape according to the bent arranging path.

Further, before the cables are held by the protectors, the individual cables are in a separated and straight state. Therefore, it is possible to suppress bulkiness before routing, and to facilitate storage and transfer.

(5) The method of assembling a wiring harness according to (4), wherein marks indicating positions to be mounted on the protectors are put on the other cable, and the other cables are held by the protectors such that the marks are positioned at the protectors.

According to this method of assembling a wiring harness, it is possible to easily make the lengths of the individual cables between the protectors different by holding the other cable while positioning the marks at the protectors, thereby bending the cables between the protectors.

(6) The method of assembling a wiring harness according to (4) or (5), wherein when the other cable is held by the protectors, a cable whose length between the protectors needs to be elongated is caught with a jig, whereby the length of the cable between the protectors is changed.

According to this method of assembling a wiring harness, when the other cables are held by the protectors, the cable whose length between the protectors needs to be elongated is caught with the jig, whereby the length of the cable between the protectors can be easily changed. Therefore, it is possible to bend the cables between the protectors.

(7) The method of assembling a wiring harness according to any one of (4) to (6), wherein the cables are twisted between adjacent protectors such that the bending direction is changed.

According to this method of assembling a wiring harness, the cables between adjacent protectors are twisted. Therefore, it is possible to very easily change the bending direction of the cables between the protectors such that the cables correspond to a three-dimensional arranging path of a fixed portion.

Advantageous Effects of Invention

According to the present invention, it is possible to provide a wiring harness which can suppress bulkiness before routing, and be easily made in a shape and form according to an arranging path, and a method of assembling the wiring harness.

BRIEF DESCRIPTION OF DRAWINGS

FIGS. 2A and 2B are views illustrating a protector provided in the wiring harness.

FIGS. 3A and 3B are views illustrating another protector provided in the wiring harness.

FIGS. 4A and 4B are views illustrating another protector provided in the wiring harness.

EMBODIMENTS OF INVENTION

Hereinafter, an example of an embodiment according to the present invention will be described with reference to the drawings.

Figure 1:
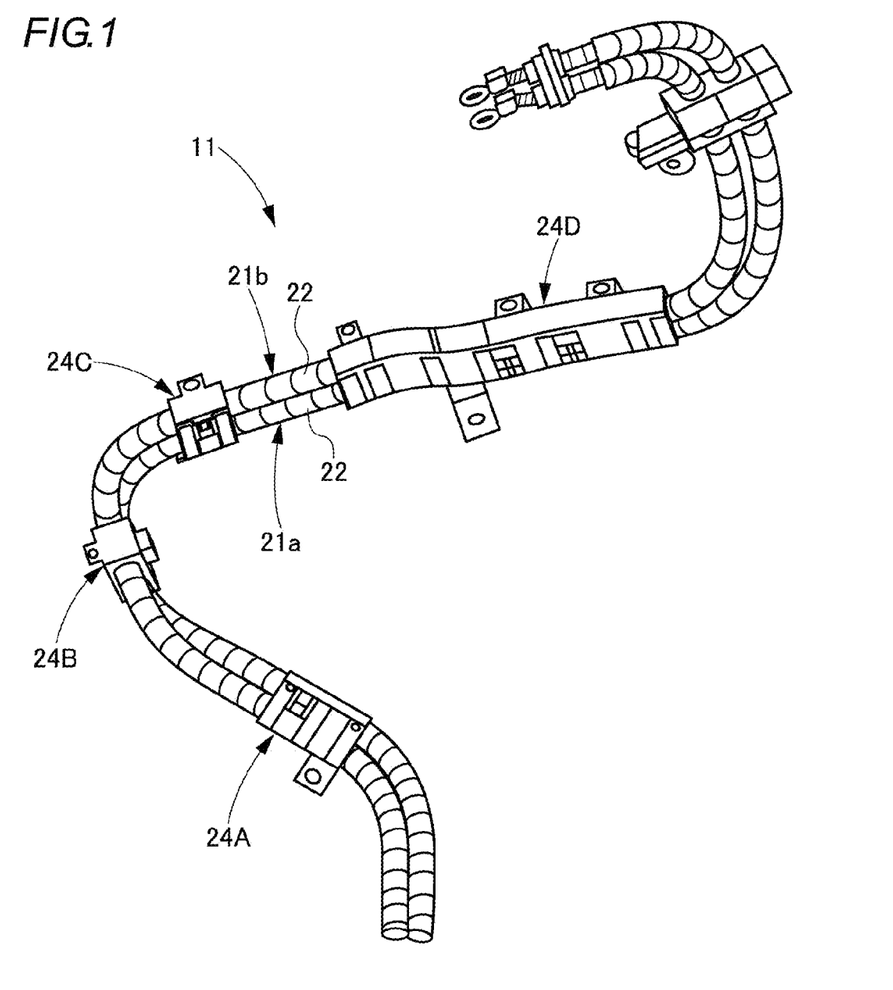
FIG. 1 is a perspective view of a wiring harness according to the present invention.

FIG. 1 is a perspective view of a wiring harness according to the present invention.

As shown in FIG. 1, a wiring harness 11 is for a vehicle such as an electric automobile and a hybrid car, and thus can be electrically connected to a battery (not shown) and an inverter (not shown) for instance.

The wiring harness 11 includes two cables 21a and 21b which allows a high-voltage high current to flow and have large diameters and high rigidity.

The outer circumferences of the cables 21a and 21b are covered with corrugated tubes 22. These corrugated tubes 22 are hollow tubes formed in a bellows form, and are made of flame retardant polypropylene and the like, for instance.

The cables 21a and 21b are routed along an arranging path of a vehicle body frame (not shown) formed in a complicated three-dimensional shape, and are fixed to the vehicle body frame at clamping positions spaced in a longitudinal direction by protectors 24A, 24B, 24C, and 24D.

The protectors 24A, 24B, 24C, and 24D are formed in shapes according to the fixing portions of the vehicle body frame.

Figure 2A:
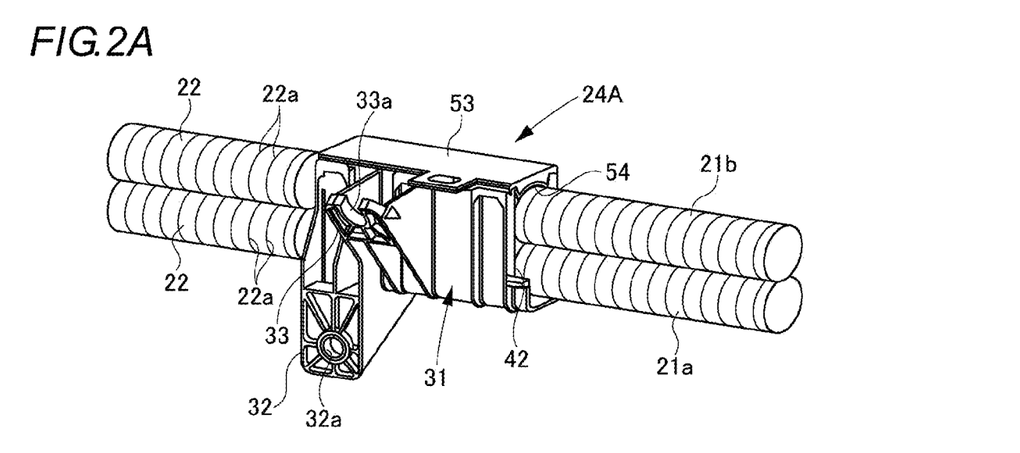
FIG. 2A is a perspective view.
Figure 2B:
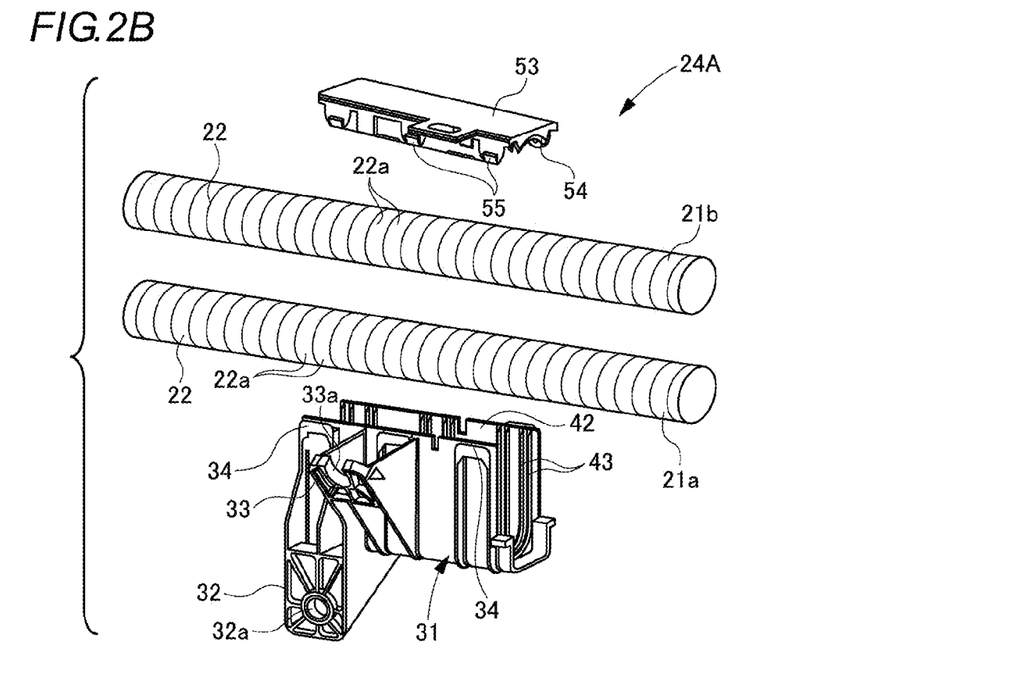
FIG. 2B is an exploded perspective view.

The protector 24A is made of a resin, and includes a cable holding portion 31 and a plurality of fixed portions 32 and 33 extending from the cable holding portion 31, as shown in FIGS. 2A and 2B.

The cable holding portion 31 has a holding groove 42 which has a U shape in a side view, and in the holding groove 42, the two cables 21a and 21b are stacked and disposed in an inserted state.

At the inner surface of the holding groove 42 of the cable holding portion 31, a plurality of locking protrusions 43 are formed at intervals in the wiring direction of the cables 21a and 21b. Then, corrugated tubes 22 having the cables 21a and 21b inserted therein are disposed in the holding groove 42, whereby the locking protrusions 43 get into grooves 22a of the corrugated tubes 22.

Also, on the open upper portion of the cable holding portion 31, a lid body 53 may be attached to cover the open upper portion. At both end portions of the lid body 53, arc-like locking claws 54 are formed to protrude toward the cable holding portion 31. Then, the lid body 53 is attached to the cable holding portion 31, whereby the locking claws 54 get into grooves 22a of the corrugated tube 22 which is disposed on the upper side in the cable holding portion 31 and has the cable 21b inserted therein.

As described above, in the protector 24A, the locking protrusions 43 of the cable holding portion 31 and the locking claws 54 of the lid body 53 lock the grooves 22a of the bellows of the corrugated tubes 22 of the cables 21a and 21b, whereby the cables 21a and 21b are disposed in a fixed state in the protector 24A.

Also, at the upper end portion of the cable holding portion 31, engaging holes 34 are formed, and at the lid body 53, fixed claws 55 are formed to protrude toward the cable holding portion 31. Then, the cable holding portion 31 is covered with the lid body 53, whereby the fixed claws 55 are engaged with the engaging holes 34 such that the lid body 53 is fixed.

At the fixed portion 32, a through-hole 32a is formed, and at the fixed portion 33, a notched portion 33a is formed. Into the through-hole 32a of the fixed portion 32 and the notched portion 33a of the fixed portion 33, stud bolts (not shown) provided in a standing manner at the vehicle body frame are inserted. In this state, nuts (not shown) are fastened to the stud bolts, whereby the protector 24A holding the cables 21a and 21b is fixed at a clamping position.

Figure 3A:
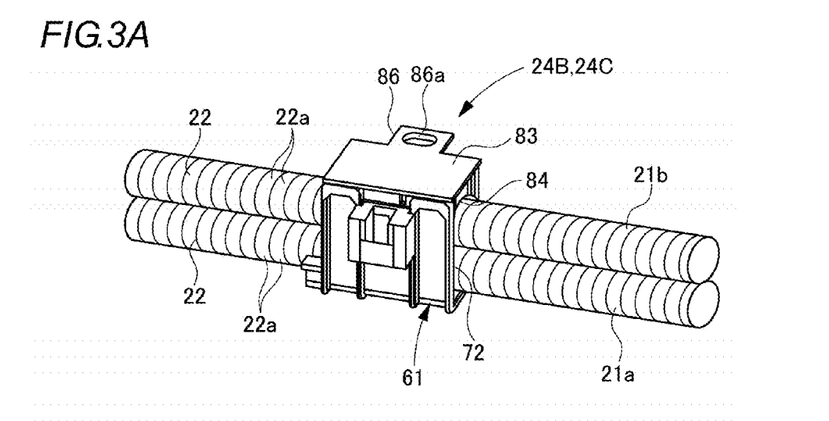
FIG. 3A is a perspective view.
Figure 3B:
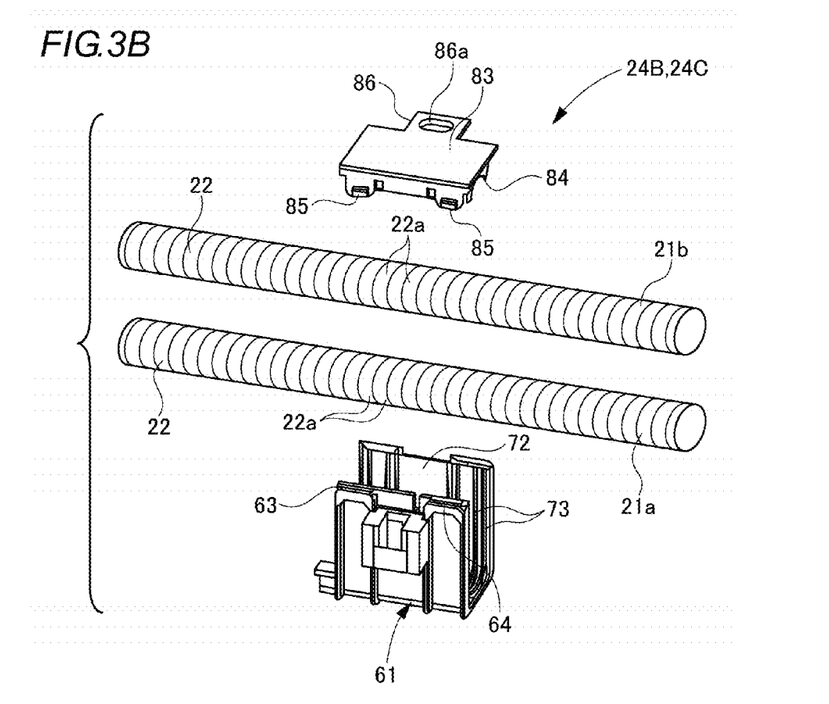
FIG. 3B is an exploded perspective view.

The protectors 24B and 24C are formed almost in the same shape, and each of the protectors 24B and 24C is made of a resin, like the protector 24A, and includes a cable holding portion 61 as shown in FIGS. 3A and 3B.

The cable holding portion 61 has a holding groove 72 which has a U shape in a side view, and in the holding groove 72, the two cables 21a and 21b are stacked and disposed in an inserted state.

At the inner surface of the holding groove 72 of the cable holding portion 61, a plurality of locking protrusions 73 are formed at intervals in the wiring direction of the cables 21a and 21b. Then, the corrugated tubes 22 having the cables 21a and 21b inserted therein are disposed in the holding groove 72, whereby the locking protrusions 73 get into grooves 22a of the corrugated tubes 22.

Also, on the open upper portion of the cable holding portion 61, a lid body 83 may be attached to cover the open upper portion. At both end portions of the lid body 83, arc-like locking claws 84 are formed to protrude toward the cable holding portion 61. Then, the lid body 83 is attached to the cable holding portion 61, whereby the locking claws 84 of the lid body 83 get into grooves 22a of the corrugated tube 22 which is disposed on the upper side in the holding groove 72 of the cable holding portion 61 and has the cable 21b inserted therein.

As described above, in the protector 24B or 24C, the locking protrusions 73 of the cable holding portion 61 and the locking claws 84 of the lid body 83 lock the grooves 22a of the bellows of the corrugated tubes 22 of the cables 21a and 21b, whereby the cables 21a and 21b are disposed in a fixed state in the protector 24B or 24C.

Also, at the upper end portion of the cable holding portion 61, engaging holes 64 are formed, and at the lid body 83, fixed claws 85 are formed to protrude toward the cable holding portion 61. Then, the cable holding portion 61 is covered with the lid body 83, whereby the fixed claws 85 are engaged with the engaging holes 64 such that the lid body 53 is fixed.

At the lid body 83, a fixing portion 86 having a through-hole 86a is formed. Into the through-hole 86a of the fixing portion 86, a stud bolt (not shown) provided in a standing manner at the vehicle body frame is inserted. In this state, a nut (not shown) is fastened to the stud bolt, whereby the protector 24B or 24C holding the cables 21a and 21b is fixed at a clamping position.

Figure 4A:
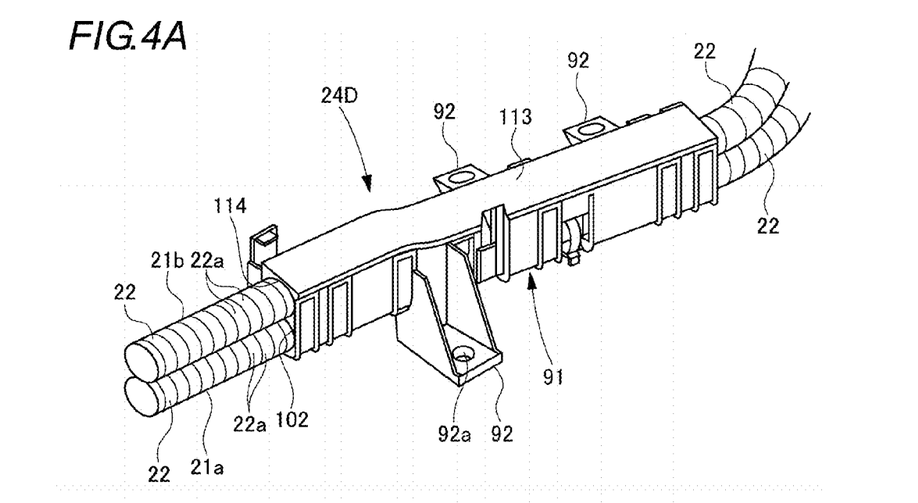
FIG. 4A is a perspective view.
Figure 4B:
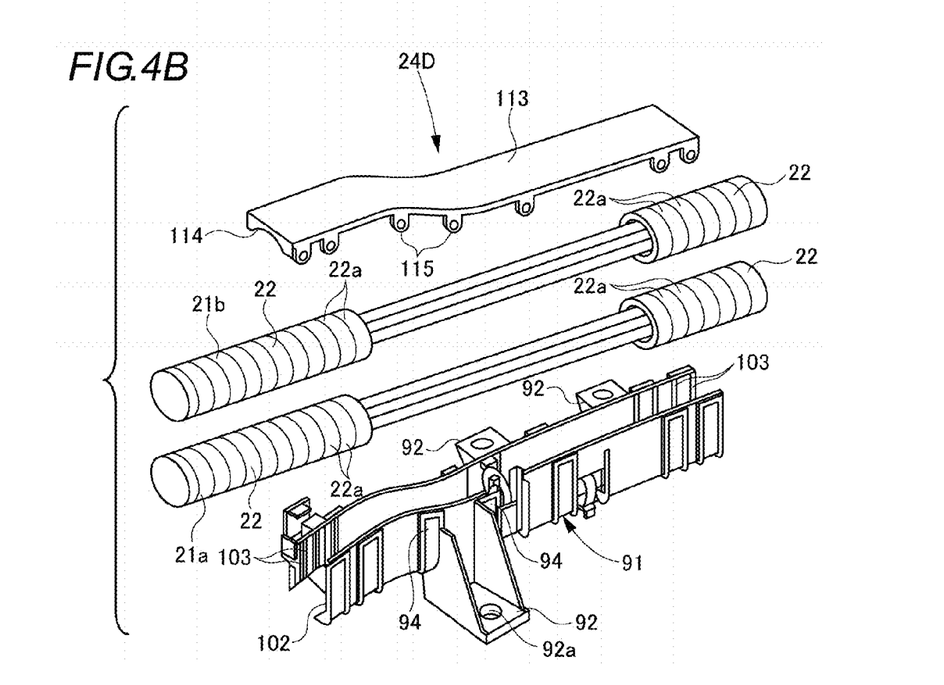
FIG. 4B is an exploded perspective view.

The protector 24D is also made of a resin, and includes a cable holding portion 91 and a plurality of fixed portions 92 extending from the cable holding portion 91 as shown in FIGS. 4A and 4B.

The cable holding portion 91 has a holding groove 102 which has a U shape in a side view, and in the holding groove 102, the two cables 21a and 21b are stacked and disposed in an inserted state.

At the inner surface of the holding groove 102 in the vicinities of both ends of the cable holding portion 91, a plurality of locking protrusions 103 are formed at intervals in the wiring direction of the cables 21a and 21b. Then, the corrugated tubes 22 having the cables 21a and 21b inserted therein are disposed in the holding groove 102, whereby the locking protrusions 103 get into grooves 22a of the corrugated tubes 22.

Also, on the open upper portion of the cable holding portion 91, a lid body 113 may be attached to cover the open upper portion. At both end portions of the lid body 113, arc-like locking claws 114 are formed to protrude toward the cable holding portion 91. Then, the lid body 113 is attached to the cable holding portion 91, whereby the locking claws 114 of the lid body 113 get into grooves 22a of the corrugated tube 22 which is disposed on the upper side in the holding groove 102 of the cable holding portion 91 and has the cable 21b inserted therein.

As described above, in the protector 24D, the locking protrusions 103 of the cable holding portion 91 and the locking claws 114 of the lid body 113 lock the grooves 22a of the bellows of the corrugated tubes 22 of the cables 21a and 21b, whereby the cables 21a and 21b are disposed in a fixed state in the protector 24D.

Also, at the upper end portion of the cable holding portion 91, engaging holes 94 are formed, and at the lid body 113, fixed claws 115 are formed to protrude toward the cable holding portion 91. Then, the cable holding portion 91 is covered with the lid body 113, whereby the fixed claws 115 are engaged with the engaging holes 94 such that the lid body 113 is fixed.

At the fixed portions 92, through-holes 92a are formed, and into the through-holes 92a, stud bolts (not shown) provided in a standing manner at the vehicle body frame are inserted. In this state, nuts (not shown) are fastened to the stud bolts, whereby the protector 24D holding the cables 21a and 21b is fixed at a clamping position.

The protector 24D is formed such that the holding groove 102 for accommodating the cables 21a and 21b is long in the longitudinal direction of the cables. Therefore, in the protector 24D, as shown in FIG. 4B, it is possible to omit the corrugated tubes 22 of portions of the cables 21a and 21b wired in the holding groove 102. In this case, the end portions of each of the corrugated tubes 22 of the cables 21a and 21b are locked by the locking protrusions 103 at both end portions of the cable holding portion 91. Then, the portions of the cables 21a and 21b where the corrugated tubes 22 have been omitted are covered and protected by the protector 24D. Also, since the corrugated tubes 22 are omitted, the rigidity of the cables 21a and 21b is reduced, and thus it is possible to facilitate wiring into the cable holding portion 91.

Further, in the case of omitting the corrugated tubes 22, it is preferable to provide abutting portions in the vicinities of the both end portions of the holding groove 102 of the cable holding portion 91, and to bring the end portions of the corrugated tubes 22 into contact with the abutting portions such that the cables 21a and 21b are positioned, when the cables 21a and 21b are wired in the holding groove 102.

In the above-mentioned wiring harness 11, the lengths of the individual cables 21a and 21b between the protectors 24A, 24B, 24C, and 24D are made different, whereby the cables 21a and 21b are bent according to the shape of the vehicle body frame for wiring.

Now, a case of assembling the wiring harness 11 will be described.

Figure 5:
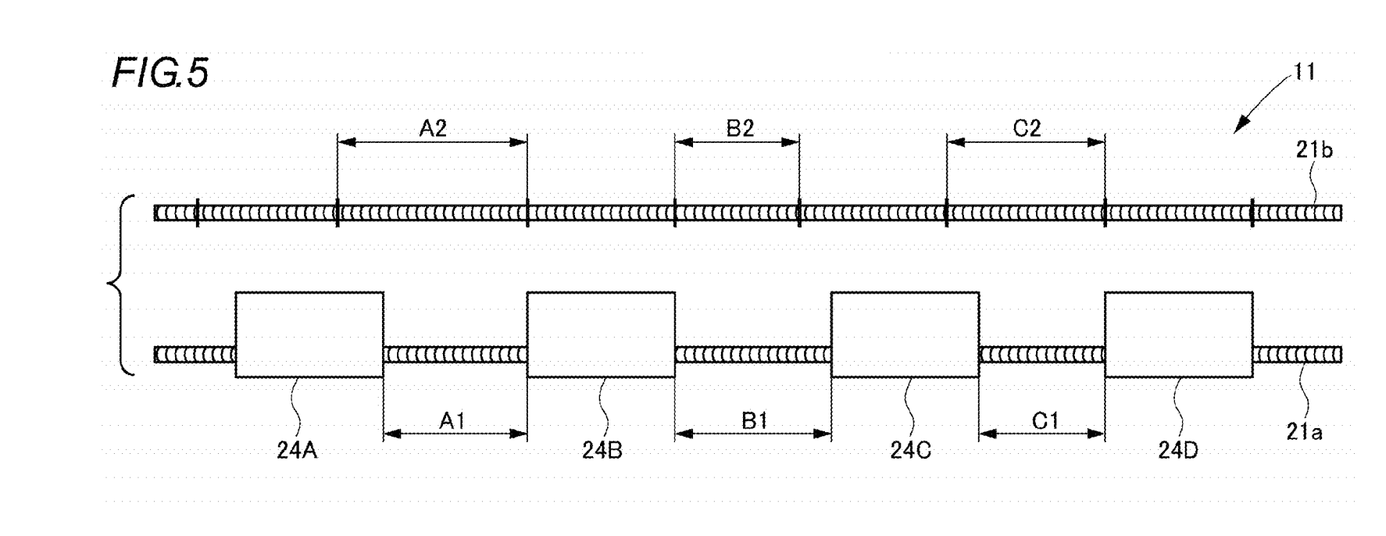
FIG. 5 is a schematic plan view illustrating the wiring harness in a separated state.

As shown in FIG. 5, the assembly positions of the protectors 24A, 24B, 24C, and 24D with respect to the cables 21a and 21b constituting the wiring harness 11 are determined according to the final three-dimensional shape.

Specifically, in the protector 24A and the protector 24B adjacent to each other in the longitudinal direction, the interval length A1 of one cable 21a and the interval length A2 of the other cable 21b are set to be different from each other.

Even in the protector 24B and the protector 24C adjacent to each other in the longitudinal direction, the interval length B1 of the one cable 21a and the interval length B2 of the other cable 21b are set to be different from each other.

Similarly, even in the protector 24C and the protector 24D adjacent to each other in the longitudinal direction, the interval length C1 of the one cable 21a and the interval length C2 of the other cable 21b are set to be different from each other.

Then, the one cable 21a is held by the protectors 24A, 24B, 24C, and 24D such that the intervals between the protectors 24A and 24B, between the protectors 24B and 24C, and between the protectors 24C and 24D become the interval lengths A1, B1, and C1, respectively.

Figure 6:
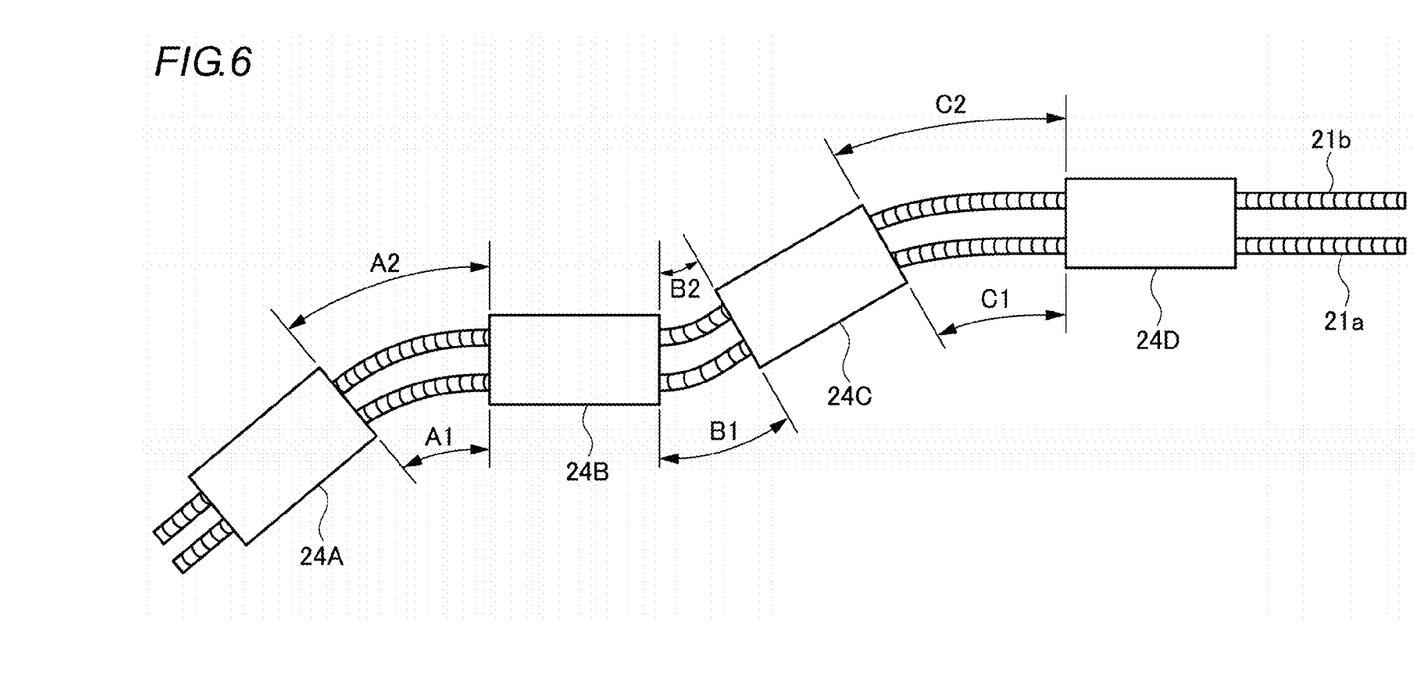
FIG. 6 is a schematic plan view illustrating the assembled wiring harness.

Next, the other cable 21b is held by the protectors 24A, 24B, 24C, and 24D. At this time, since the interval lengths A2, B2, and C2 of the other cable 21b are different from the interval lengths A1, B1, and C1 of the one cable 21a, if the other cable 21b is held by the protectors 24A, 24B, 24C, and 24D, as shown in FIG. 6, in a plane, the cables 21a and 21b are bent toward the shorter interval length sides between the protectors 24A, 24B, 24C, and 24D.

Here, with respect to a method of mounting the cables 21a and 21b having different interval lengths between the protectors 24A, 24B, 24C, and 24D on the protectors 24A, 24B, 24C, and 24D, a case of mounting the cables 21a and 21b on the protectors 24A and 24B will be described as an example.

Figure 7:
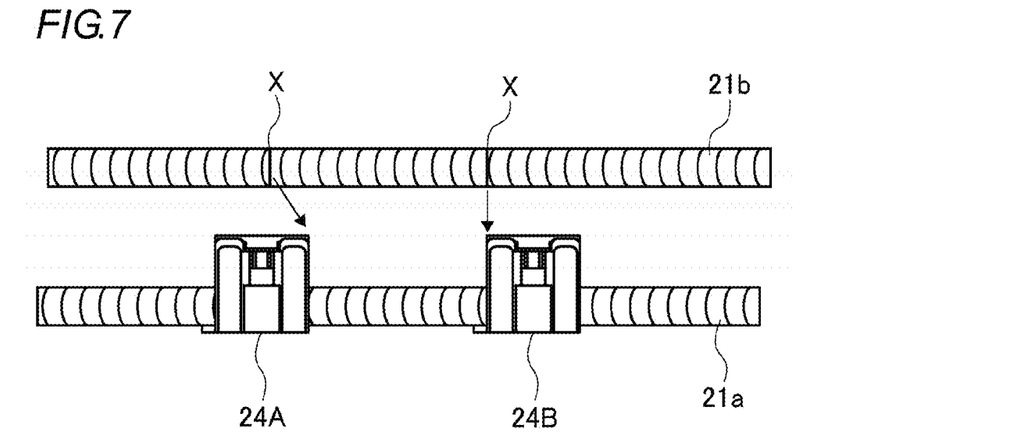
FIG. 7 is a schematic plan view illustrating a method of mounting the other cable on protectors.

In a case of mounting the other cable 21b having the different interval length A2 on the protectors 24A and 24B on which the one cable 21a having the interval length A1 is mounted, as shown in FIG. 7, it is possible to put marks X at the positions of the other cable 21b, to be mounted on the protectors 24A and 24B by winding a tape (not shown) or coloring, and mount the other cable 21b on the protectors 24A and 24B such that the marks X are positioned at end portions of the protectors 24A and 24B. Then, it is possible to easily mount the cables 21a and 21b having different interval lengths between the protectors 24A and 24B and bend the cables 21a and 21b between the protectors 24A and 24B.

Figure 8:
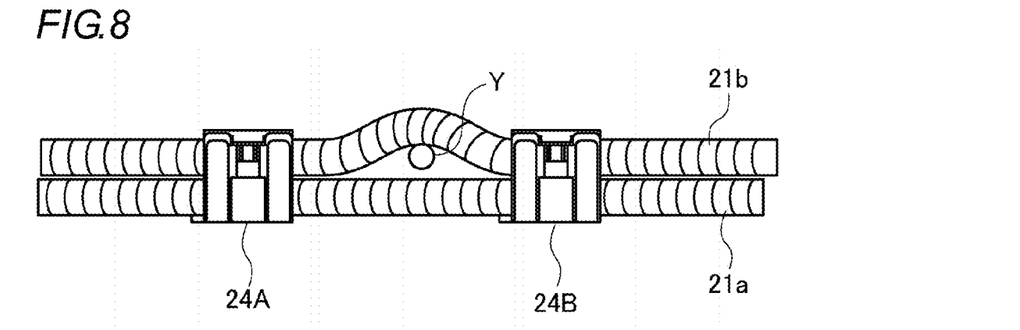
FIG. 8 is a schematic plan view illustrating anther method of mounting the other cable on the protectors.

Also, as shown in FIG. 8, when the other cable 21b is mounted on the protectors 24A and 24B, it may be possible to catch the other cable 21b, which is the longer interval length side, with a jig Y such as a pin so as to bend the other cable 21b, thereby elongating the path length of the other cable 21b, and mount the other cable 21b on the protectors 24A and 24B. Even in this case, it is possible to easily mount the cables 21a and 21b having different interval lengths between the protectors 24A and 24B and bend the cables 21a and 21b between the protectors 24A and 24B.

Then, as described above, in the wiring harness 11 bent in a plane, if the cables 21a and 21b are twisted between the protectors 24A and 24B, the protectors 24B and 24C, or the protectors 24C and 24D adjacent in the longitudinal direction, the bending direction of the cables 21a and 21b bent in the plane is changed by the twisting, such that the wiring harness 11 is formed in an arranging path bent in a three-dimensional shape according to the vehicle body frame.

As described above, according to the wiring harness and the method of assembling the wiring harness related to the above-mentioned embodiment, between the protectors 24A, 24B, 24C, and 24D, the lengths of the cable 21a and the lengths of the cable 21b are made different from each other, such that the cables are bent between the protectors 24A, 24B, 24C, and 24D. Therefore, it is possible to easily arrange the cables with respect to the bent arranging path.

Also, before being held by the protectors 24A, 24B, 24C, and 24D, the cables 21a and 21b are in a separated state. Therefore, it is possible to suppress bulkiness before routing, and to facilitate storage and transfer.

Further, even when the arranging path of the vehicle body frame is a three-dimensional route, since it is possible to twist the cables between the protectors 24A, 24B, 24C, and 24D adjacent in the longitudinal direction, thereby changing the bending direction between the protectors 24A, 24B, 24C, and 24D, it is possible to very easily make the cables in a shape according to the three-dimensional arranging path of the vehicle body frame.

The present invention is not limited to the above-mentioned embodiment, but can be appropriately modified and improved. Further, the material, shape, size, number, disposed position, etc. of each of the constituent elements of the aforesaid embodiment are not limited thereto and may be arbitrary so long as the invention is attained.

For example, in the above-mentioned embodiment, the wiring harness 11 including the two cables 21a and 21b bound has been described as an example. However, the number of cables constituting the wiring harness 11 is not limited to two as long as the number of cables is more than one.

Also, in the above-mentioned embodiment, although not described in detail, the wiring harness is assembled by applying the protectors with respect to the plurality of cables bent on a routing plate. However, it is possible to assemble the wiring harness by detaching the cables from the routing plate, aligning marks, and applying the protectors to the mark positions.

Although the present invention has been described in detail or with reference to a specific embodiment, it is apparent to those skilled in the art that it is possible to add various changes or modifications without departing from the sprit and scope of the present invention.

This application is based on Japanese Patent Application (Application No. 2010-124966) filed on May 31, 2010 whose contents are incorporated herein by reference.

DESCRIPTION OF REFERENCE NUMERALS

11 Wiring Harness
21a, 21b Cable
24a, 24b, 24c, 24d Protector
A1, A2, B1, B2, C1, C2 Interval Length
X Mark
Y Jig

The invention claimed is:

1. A wiring harness in which a plurality of cables are bound by a plurality of protectors provided at intervals in a longitudinal direction, the wiring harness arranged along an arranging path of a fixed portion, wherein:
the cables are covered with hollow tubes formed in a bellows form having grooves, and locking protrusions formed at an inner surface of holding grooves formed in the protectors lock the grooves of the tubes, whereby the cables are collectively held by the protectors,
the lengths of the plurality of cables between the protectors are made different and the protectors lock the cables, such that the cables are bent between the protectors,
wherein a cable of the plurality of cables is twisted by a predetermined number of degrees about a longitudinal axis of the cable between adjacent protectors such that a bending direction of the wiring harness is changed according to a three-dimensional arrangement path, and
wherein the protectors are rotationally offset from one another so as to match the predetermined number of degrees.

2. The wiring harness according to claim 1, wherein marks put at different positions of at least one cable and the other cable in the longitudinal direction exist at positions to be mounted on the protectors.

3. A method of assembling a wiring harness in which a plurality of cables are bound by a plurality of protectors provided at intervals in a longitudinal direction, the wiring harness arranged along an arranging path of a fixed portion, the method comprising:
mounting the plurality of protectors at predetermined positions of one cable, respectively; and
making the other cable be held by each protector such that the length of the other cable between adjacent protectors is different from the length of the one cable, thereby bending the cables between the protectors due to the difference between the lengths of the cables between the protectors, wherein the cables are covered with hollow tubes formed in a bellows form having grooves, wherein holding grooves are formed in the protectors, and locking protrusions are formed at an inner surface of the holding grooves, wherein the locking protrusions lock the grooves of the tubes, whereby the one cable and the other cable are fixed by the protectors, and wherein the one cable is twisted by a predetermined number of degrees about a longitudinal axis of the cable between adjacent protectors such that a bending direction of the wiring harness is changed according to a three-dimensional arrangement path, and wherein the protectors are rotationally offset from one another so as to match the predetermined number of degrees.

4. The method of assembling a wiring harness according to claim 3, wherein marks indicating positions to be mounted on the protectors are put on the other cable, and the other cables are held by the protectors such that the marks are positioned at the protectors.

5. The method of assembling a wiring harness according to claim 3, wherein when the other cable is held by the protectors, a cable whose length between the protectors needs to be elongated is caught with a jig, whereby the length of the cable between the protectors is changed.

6. The method of assembling a wiring harness according to claim 3, further comprising twisting the other cable, thereby bending the cables between the protectors due to the predetermined number of degrees of twisting.

7. The wiring harness according to claim 1, wherein the holding grooves are formed to have a U shape in a side view, and wherein the cables are stacked and disposed in the holding grooves having the U shape in the side view.

8. The method of assembling a wiring harness according to claim 3, wherein the holding grooves are formed to have a U shape in a side view, and wherein the cables are stacked and disposed in the holding grooves having the U shape in the side view.

* * * * *